July 20, 1943.    W. BIERMAN ET AL    2,324,672
MEANS FOR MEASURING AND RECORDING POSTURE
Filed June 21, 1941    2 Sheets-Sheet 2
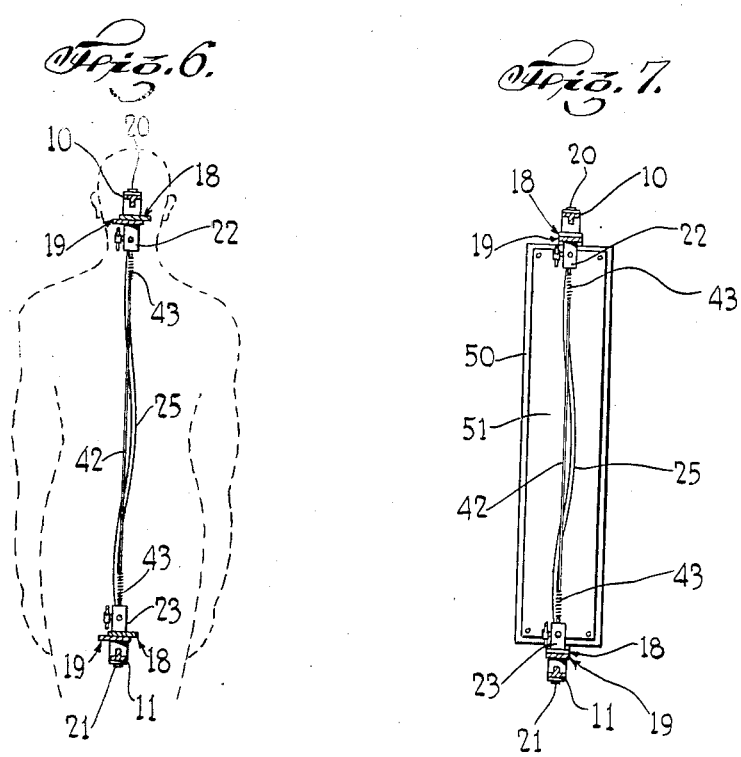
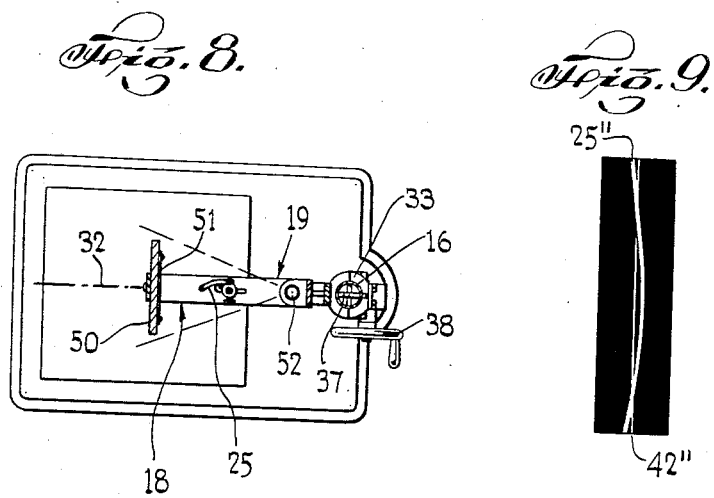
INVENTORS
WILLIAM BIERMAN
ABRAHAM W. SCHENKER
BY
ATTORNEY Patented July 20, 1943

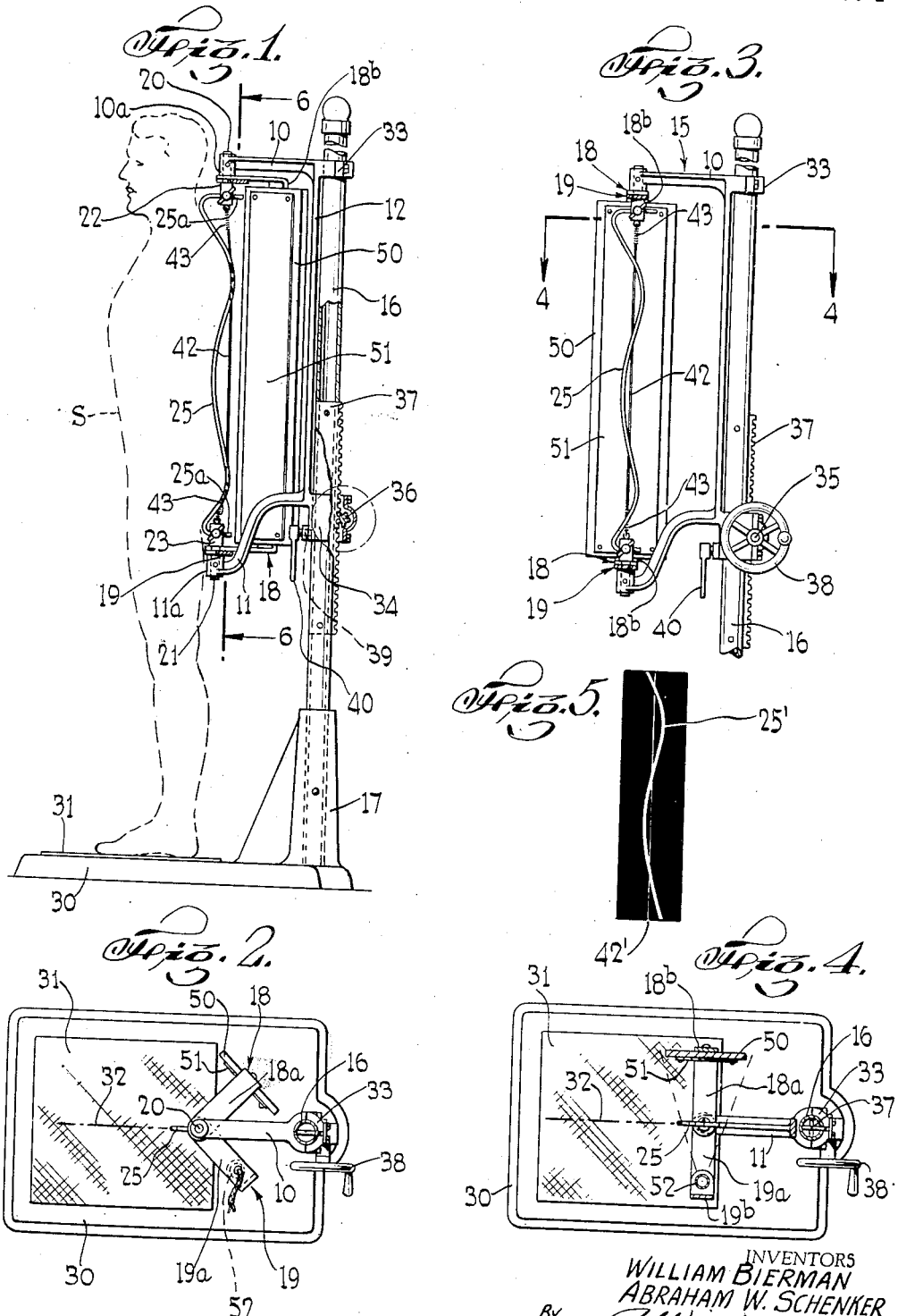

2,324,672

UNITED STATES PATENT OFFICE 2,324,672

MEANS FOR MEASURING AND RECORDING POSTURE

William Bierman, New York, and Abraham W. Schenker, Richmond Hill, N. Y.

Application June 21, 1941, Serial No. 399,096

8 Claims. (Cl. 33—175)

This invention relates generally to measuring devices. More particularly our invention relates to an improved method and means for measuring and recording spinal and similar body curvatures of the type disclosed in the copending application of William Bierman, Serial No. 301,397, filed October 26, 1939, for Posture meter.

One of the objects of our invention is to provide a method and means for measuring and recording spinal curvatures which shall be characterized by the high degree of simplicity of its construction and use, and which shall represent an improvement over the method and construction disclosed in the said copending application as well as over the prior art generally.

Another object of our invention is to provide a posture meter of the class described having improved means for simultaneously measuring antero-posterior and lateral spinal curvatures, and for rapidly and efficiently recording such curvatures.

Other objects of our invention will, in part, be obvious and in part hereinafter pointed out.

The invention accordingly consists in the features of construction, combinations of elements and arrangement of parts which will be exemplified in the constructions and in the method steps hereinafter described and of which the scope of application will be indicated in the claims.

In the accompanying drawings, in which is shown one or more of the various possible embodiments for satisfactorily carrying out our invention;

Fig. 1 is a side elevational view, partly in section, of a posture measuring and recording device constructed in accordance with our invention, and illustrating the relative positions of the parts for effectively measuring posture;

Fig. 2 is a top plan view thereof;

Fig. 3 is a view similar to Fig. 1, but illustrating the relative positions of the parts of the apparatus for effectively recording the antero-posterior curvature as measured in Fig. 1;

Fig. 4 is a cross-sectional view taken substantially on the line 4—4 of Fig. 3;

Fig. 5 illustrates a type of record of the antero-posterior curvature of the spine, made in accordance with our invention;

Fig. 6 is a cross-sectional view taken substantially on the line 6—6 of Fig. 1;

Fig. 7 is a view similar to Fig. 3 but illustrating the relative positions of the parts of the apparatus for effectively recording the lateral curvature of the spine as measured in Fig. 6;

Fig. 8 is a cross-sectional view similar to Fig. 4 but illustrating the Fig. 7 positions of the parts; and Fig. 9 is a view similar to Fig. 5, but illustrating a type of record of the lateral curvature of the spine, made in accordance with our invention.

Referring now in detail to the drawings we have shown an apparatus for measuring and recording spinal and other body curvatures constructed in accordance with our invention and comprising an upper bracket member 10 and a lower bracket member 11, interconnected by a vertically disposed arm 12 to provide an integral supporting unit 15. The said unit 15 may be suitably mounted on a standard 16, which in turn may be supported on a pedestal member 17. Mounted between the brackets 10 and 11 for rotational movement about a substantially vertical axis are a pair of frames 18 and 19, the purposes and functions of which will soon become apparent. The frames 18 and 19 may be channel-shaped, comprising the horizontal arms 18a and 19a respectively, and the vertical arms 18b and 19b respectively. A pivot pin or shaft 20 supported in the bearing portion 10a of the bracket 10, and a pivot pin or shaft 21 supported in the bearing portion 11a of the bracket 11, serve to rotatably support the said frames 18 and 19.

In accordance with our invention we have provided the following novel and improved means for simultaneously and quickly reproducing the actual antero-posterior and lateral curvatures of any desired portions of the body, such as, for example, the spinal curvatures, as indicated in the drawings.

A pair of terminal members 22 and 23 are attached to or they may form a part of the pivot shafts 20 and 21 respectively. A member 25 of any suitable manually bendable material is supported between the terminal members 22 and 23 by having its opposite ends 25a attached to the said terminal members 22 and 23, as clearly shown in the drawings.

One type of material which we have found to be highly satisfactory for the member 25 is lead wire, because it may be readily manually bent in any direction and because it will retain its bent form for a sufficient time to carry out the purpose of the invention. Such a wire may, if desired, be encased in rubber tubing.

In Figs. 1 and 2 we have illustrated the manner in which the postural measurements of the human spine may be taken in accordance with the above description of the apparatus. The subject, whose measurements are to be reproduced, is properly positioned as shown by the dotted line figure S, with his back to the member 25 and with the axis of his spine in substantial vertical alignment with the vertical axes of the terminal members 22 and 23. The operator, then manually bends the member 25 up against the spine of the subject to conform the said member 25 to the actual antero-posterior as well as to the actual lateral spinal curvatures. The subject may then withdraw from the apparatus, and there remains the member 25 which is an exact reproduction of his spinal curvatures. In Fig. 1 is shown the contour of the antero-posterior curvature of the spine of the subject S, while in Fig. 6 there is shown his lateral spinal curvature, both of which were simultaneously obtained by a single means, namely the manually bendable member 25, and in a single operation.

While the reproduction of the spinal curvatures of the subject's spine is being made, the frames 18 and 19 may be rotated to the position shown in Fig. 2 of the drawings where it is noted that they will be out of the path of the subject and of the operator.

As shown in Figs. 1 and 2, if desired, a base or platform 30 may be provided for the subject to stand upon, and the standard pedestal member 17 may be integral with the said base 30 or it may be attached thereto. Any suitable type of mat 31 may overlie the platform for the comfort of the user and a center or guide line 32 may be provided on the said mat 31 to facilitate the proper positioning of the subject.

To render the device suitable for use in connection with children or with people of different heights, the following mechanism may be provided for adjustably raising or lowering the unit 15 on the standard 16.

The unit 15 is provided with a pair of split clamp members 33 and 34 which may be integral with the arm 12 and which slidably encircle the standard 16. Journaled in the lower clamp member 34 is a shaft 35 on which there is mounted for rotation therewith, a pinion 36 which in turn is in mesh with the teeth of a gear rack 37 fixed to the standard 16.

It is thus seen from the above described construction that when it is desired to lower the unit 15 it is merely necessary to rotate the shaft 35 in a clockwise direction. For raising the unit 15, the said shaft must be rotated in a counter-clockwise direction. To facilitate the rotational movement of the shaft 35, a wheel 38 may be provided. The unit 15 may be locked in its selected position on the standard 16 by a suitable set screw 39 carried by the clamp member 34 and provided with a lever handle 40 to facilitate the rotation thereof.

To serve as a normal spinal plumb line or vertical axial guide against which to measure the spinal or other body curvatures, we provide a wire or rod member 42, relatively thinner than the member 25 and of a material which will not be manually bent from its straight line. The wire or rod member 42 is kept relatively taut and in a vertical position at all times by springs 43 at opposite ends thereof, the said springs being, in turn, fixed to the terminal members 22 and 23.

As noted in Fig. 1 of the drawings while the postural measurements are being made the wire or rod 42 will be laterally moved out of the way by the body of the subject, and will thereafter spring back into its original effective position as shown in Fig. 3.

Having made an exact reproduction of the postural characteristics of the subject as above described, we provide the following novel method and means for recording the same.

Attached to a vertical arm of one of the frames, such as, for example, the arm 18b of the frame 18 for movement therewith, is a record sheet supporting member 50, on which there is suitably mounted a record sheet 51. On the corresponding vertical arm 19b of the frame 19 there is mounted a suitable source of illumination 52, such as an incandescent lamp, a mercury tube or the like, which may be used in combination with lenses suitable for the purposes of our invention.

When it is desired to make a record of the antero-posterior spinal curvature of the subject, the frames 18 and 19 are rotated from their positions as shown in Figs. 1 and 2, to the positions shown in Figs. 3 and 4, where it is noted that the frames 18 and 19 are in alignment with each other and at right angles to the guide line 32. In such position the light from the source 52 will cast a shadow of the member 25 on the record sheet 51. The line shadow 25' corresponding to the antero posterior curvature of the subject's spine may be then traced on the sheet 51 to obtain a permanent record thereof. At the same time a shadow of the plumb line 42' cast by the wire or rod 42 will also appear on the sheet and may be similarly traced.

If desired the surface of the sheet 51 may be light-sensitised, with a suitable coating such as is used on blue print paper or any other similar light-sensitized printing papers, in which case after proper developing the record will appear as in Fig. 5 of the drawings.

To record the lateral curvature of the subject's spine, the procedure is similar to that described above except that the frames 18 and 19 are rotated to the position shown in Figs. 7 and 8 where it is noted that the frames 18 and 19 are in alignment and with the guide line 32. The shadow of the member 25 cast on the sheet 51 will represent the lateral spinal curvature of the subject, conforming to the manually bent member as it appears in Fig. 6. As hereinbefore described in connection with the recording of the antero-posterior spinal curvature the shadows 25'' of the member and of the wire or rod 42'' on the sheet 51 may be traced, or sensitized recording elements may be employed. In the latter case, the record will appear as in Fig. 9 of the drawings.

While in the drawings we have shown the wire or rod member 42 as being mounted in a position coinciding with the vertical axis of the terminal members, it is understood that the said wire or rod member may be mounted in any other selected position to satisfactorily perform its function as hereinbefore described. One such position, for example, would be in front of the record sheet and closely adjacent thereto.

In accordance with the provisions of the patent statutes, I have herein described the principle and operation of my invention, together with apparatus which I now consider to represent the best embodiments thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a posture measuring device of the class described, in combination, a member adapted to be manually bent to conform to the contour of the spine for simultaneously measuring antero-posterior and lateral spinal curvatures, and means for supporting said member, said supporting means comprising a base, an upright on said base, a frame mounted on said upright for up and down movement thereon, said member being mounted on said frame for movement therewith.

2. In a posture measuring device of the class described, in combination, a wire member adapted to be manually bent to conform to the contour of the spine for simultaneously measuring antero-posterior and lateral spinal curvatures, and means for supporting said member, said supporting means comprising a base, an upright on said base, a frame mounted on said upright for up and down movement thereon, opposite ends of said wire member being attached to said frame leaving the intermediate portion thereof free to be manually flexed as desired.

3. In a posture device of the class described, in combination, a wire member adapted to be manually bent to conform to the contour of the spine for simultaneously measuring antero-posterior and lateral spinal curvatures, means for supporting said member and means for recording said measured spinal curvatures, said last named means comprising a recording element, a source of light, and means for so supporting said light with respect to said bent member and said recording element whereby a shadow of said bent member will be cast on said recording element.

4. In a posture device of the class described, the combination according to claim 3, in which the recording element and the light source are rotatably mounted substantially about said bent member as an axis so that when the bent member, light source and recording element are aligned, in one position, a shadow of the bent member representing the antero-posterior spinal curvature will be cast on the recording element, and when the light source and recording element are rotated 90 degrees from said last named position, a shadow of the bent member representing the lateral spinal curvature will be cast on the recording element.

5. In a posture meter of the class described, the combination according to claim 3, in which the recording element and the light source are rotatably mounted substantially about said bent member as an axis so that when the bent member, light source and recording element are aligned in one position a shadow of the bent member representing the antero-posterior spinal curvature will be cast on the recording element and when the light source and recording element are rotated 90 degrees from said last named position, a shadow of the bent member representing the lateral spinal curvature will be cast on the recording element, said recording element comprising a light sensitive surface.

6. In a posture meter of the class described, in combination a wire member or the like adapted to be manually bent to conform to the contour of the spine for simultaneously measuring antero-posterior and lateral spinal curvatures, means for supporting said wire member, a second wire or rod member adapted to serve as a plumb or gauge line for the vertical axis of any selected portion of the body to be measured, and means for supporting said second wire or rod member.

7. In a posture meter of the class described, the combination according to claim 6 in which the said second wire or rod member is resiliently mounted so that it will automatically be moved out of the path of the subject to be measured during the operation of manually bending said first wire member and automatically assume its original position when the subject is removed.

8. In a posture meter of the class described, the combination according to claim 3 in which a second wire or rod member is provided, said second wire or rod member being adapted to serve as a plumb or gauge line for the vertical axis of the spine of the subject, and means for supporting said second wire or rod member, said first wire member and said second wire or rod member being of relatively different thicknesses so that their shadows cast upon the recording element will be readily distinguishable.

WILLIAM BIERMAN.
ABRAHAM W. SCHENKER.